April 7, 1942.  R. F. SCHNELLER  2,279,146
COUPLER
Filed April 12, 1941
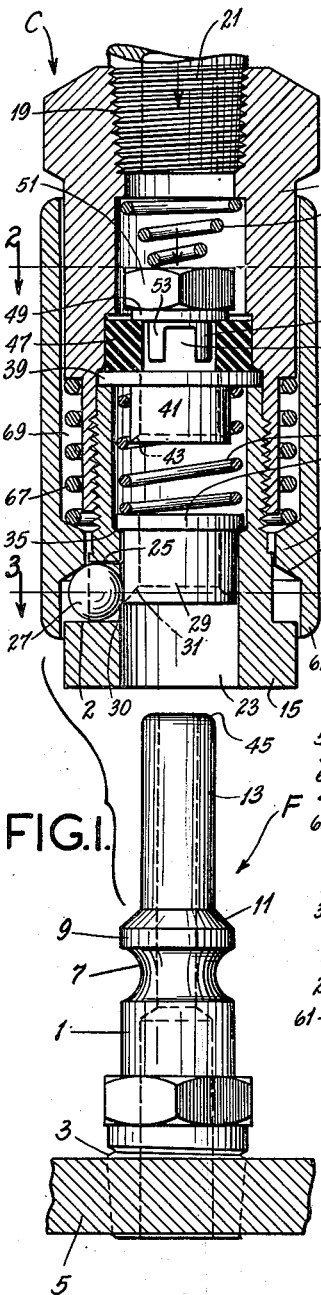
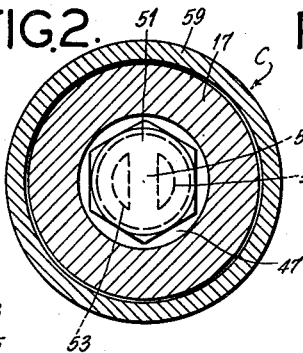
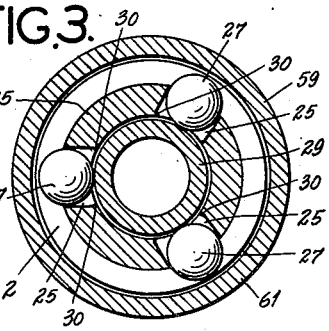
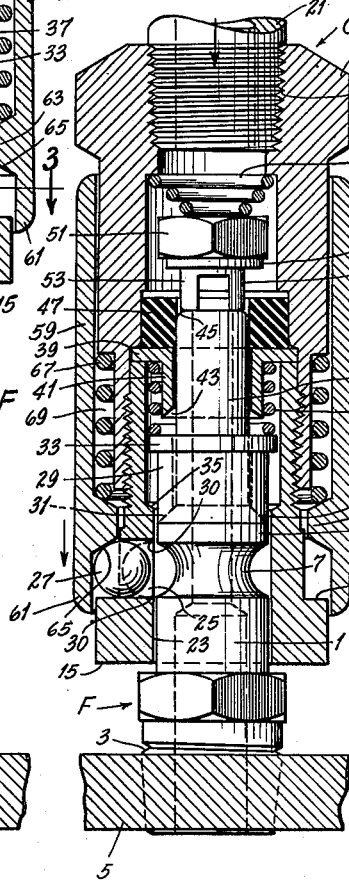
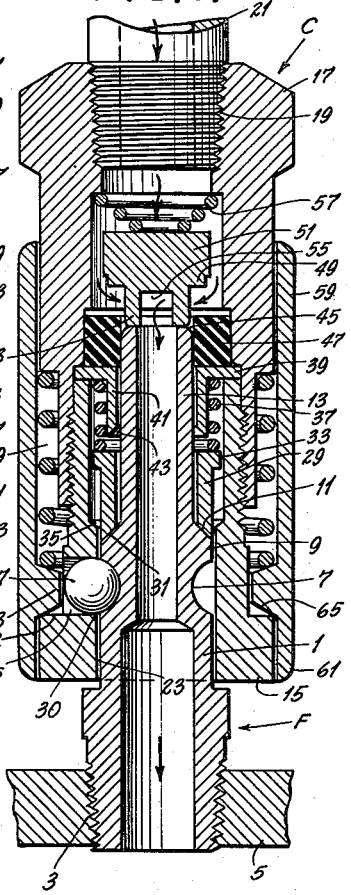
Rudy F. Schneller,
Inventor.
Haynes and Koenig,
Attorneys.

Patented Apr. 7, 1942

2,279,146

UNITED STATES PATENT OFFICE 2,279,146

COUPLER

Rudy F. Schneller, St. Louis, Mo., assignor to Lincoln Engineering Company, St. Louis, Mo., a corporation of Missouri Application April 12, 1941, Serial No. 388,296

3 Claims. (Cl. 285—169)

This invention relates to couplers, and with regard to certain more specific features to couplers for fluid conduits.

Among the several objects of the invention may be noted the provision of a simple and reliable coupler for making a fastening between an air or like conduit with a fitting; the provision of a coupler of this class which may be applied and removed with a high degree of facility by natural movements; the provision of a coupler of the class described in which fluid flow is automatically cut off upon detachment but which is started automatically upon attachment; and the provision of a coupler of the class described in which is a low degree of resistance to flow after attachment. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a vertical section of the coupler shown separated from a fitting;

Fig. 2 is a horizontal section taken on line 2—2 of Fig. 1;

Fig. 3 is a horizontal section taken on line 3—3 of Fig. 1;

Fig. 4 is a view similar to Fig. 1 showing the coupling during application to the fitting; and, Fig. 5 is a view similar to Fig. 4 showing completion of the attachment.

Similar reference characters indicate corresponding parts throughout the several views of the drawing.

Referring now more particularly to Fig. 1, there is shown at numeral 1 the body of a nipple or fitting F for receiving fluid, which in this case is air. This fitting F is threaded at 3 for fastening to an air-receiving compartment 5. The fitting is provided with a ball-receiving groove 7 which is behind a shoulder or enlargement 9. Above the shoulder 9 is a beveled portion 11 connecting with a cylindric sleeve 13.

Above the fitting F is shown the coupling C which consists of a guide sleeve 15 threaded onto a hollow body 17. The body 17 is threaded at 19 to provide for attachment to part of the line 21 which is to be coupled.

At the lower end of the guide sleeve 15 is an opening 23 which slidingly fits the portions 1 and 9 of the fitting F. Extending radially from the opening 23 and through the sleeve 15 are three openings 25 (Fig. 3) for clutch balls 27. The balls are located behind a shoulder 2 and are of a radius to fit the radius of the groove 7 when moved inwardly.

The balls 27 are prevented from moving inwardly from the position shown in Fig. 1 by a holding sleeve 29 which slides down into the opening 23 a distance to block inward movement of the balls. This sleeve has a chamfered lower edge 31 for engagement with the beveled portion 11 upon application to the fitting F. At its upper end the sleeve 29 is provided with a flange 33 which rests upon a shoulder 35 to limit downward movement. A compression spring 37 biases the sleeve 29 downward for engagement between the flange 33 and the shoulder 35 when the coupling C is disconnected (Fig. 1). The compression spring 37 reacts against a flange 39 of a fixed guide sleeve 41 which also is chamfered at its bottom end, as indicated at 43, so that it also may be guided into place over the cylindric portion 13. The upper edge portion 13 of fitting F is rounded at 45 to provide a smooth engagement with 31 and 43.

The sleeve 41 is stationary, being held in the body 17 by the threaded sleeve 15. The flange 39 holds in position a packing 47 which, during assembly, is lightly compressed endwise, so that it radially hugs the portion 13 of the fitting F when applied. This forms a leak-proof seal.

The packing 47 also forms a seat for a rim seat 49 of a hexagonal valve 51. The seat 49 is round to form a complete seal when seated, while the upper portion of the valve is made hexagonal to pass air.

Extending from the lower portion of the valve 51 is a pair of extensions 53 for contacting the end of the fitting F. These will pass air between them at 55 when the valve is open. The valve is normally held to its seat on the packing 47 by means of a compression spring 57. Thus when the coupling C is detached, the valve is normally closed by the spring 57 and in addition by pressure behind it (Fig. 1).

Around the body 17 is a sliding outer sleeve 59, having a guide portion 61 sliding on the flanged end 2 of the sleeve 15. This outer sleeve 59 is provided with an inward shoulder 63 which is chamfered as indicated at 65. The sleeve is movable back into a position where the chamfer 65 is above the balls 27. When the balls 27 are prevented from moving inwardly by the sleeve 29, they hold up the sleeve 59 by interlocking action at the chamfer 65. The sleeve 59 is biased downward by means of a compression spring 67 positioned in a space 69 in the body 17 and reacting at the upper end against body 17. In the lower position of sleeve 59, the shoulder 63 at chamfer 65 rests upon flange 2.

Operation is as follows, referring first to Fig. 1:

The valve 51 is shut by reason of the biasing action of the spring 57 and the pressure of the fluid behind it. It forms a seal on the relatively soft seat of the packing 47, which may be made of artificial rubber, for example. The coupling C at this time is grasped around the outer sleeve 59 (which is knurled) and simply pushed toward the fitting F. This is a natural movement for the purpose.

As shown in Fig. 4, the inner locking sleeve 29 slides down the cylindric portion 13 of the fitting F, and its chamfer 31 finally contacts the beveled portion 11, whereupon the sleeve is relatively pushed back against bias of the spring 37. This releases the balls 27 for inward motion under the action of the bevel 65 on the shoulder 63. The sleeve 59 is under bias of the spring 67, and after the parts have attained the relationship shown in Fig. 4, action thereafter is automatic under bias from spring 67. Thus the sleeve 59 moves from the Fig. 4 to the Fig. 5 position without additional manual push. This automatically locks the balls 27 into the groove 7, so that pressure reaction will not blow the coupling and the fitting apart (Fig. 5).

During the movement illustrated in Fig. 4, the guide sleeve 41 also comes into position over the cylindric portion 13, and guides the packing 47 into sealing position around the end of the fitting. At the same time, the extensions 53 are contacted to open the valve 51 against the bias of the spring 57 and against the bias of the pressure of the fluid behind the valve. Flow through the coupling is therefore released as indicated by arrows in Fig. 5.

Release is quite easily effected simply by pulling upon the sleeve 59. This withdraws the shoulder 63 into the position shown in Fig. 4 to release the balls 27 from the groove 7. Pulling results in lifting the sleeve 15. This lifts the balls clear of the shoulder 9 on the fitting F and they become trapped behind locking sleeve 29. At the same time, as the packing 47 is withdrawn from the end of the cylindric portion 13, the valve 51 automatically shuts against outflow of fluid.

An advantage of the invention is the ease of application. In various sleeve types of couplers heretofore proposed, it was necessary manually to draw back the sleeve while trying to push forward the coupler as a whole. These unnatural and inconsistent movements were difficult to perform.

With the present coupler, the sleeve 59 is simply pressed down with the same pressure that applied the coupling, and as soon as the lock sleeve 29 releases the balls, the spring 67 automatically pushes down the sleeve 59 with a snap, helping the operator's hand to lock in the balls. The snap-action is also a signal that coupling has been completed. To conceive more effectively of the advantage in this respect, it may be noted that if the fitting is pressed into the coupler while holding the coupler stationary, without touching the sleeve 59, the action is to push back the locking sleeve 29 whereupon the spring 67 automatically, without even being touched, moves toward the fitting to push the balls into locking position. This fact of the automatic action of the sleeve 59 in the direction in which it is being manually pushed, provides a very desirable operating feature. It will be understood however, that the invention also has advantages without the spring 67.

Furthermore, upon pulling the coupler away from the fitting, the manual pull is naturally in the direction for moving the sleeve 59 against the bias of spring 67. Thus, the action needed anyway for withdrawing the coupling from the fitting is the same one used to unlock the balls. Then as the coupler is withdrawn, the locking sleeve 29 automatically moves into position to hold the balls where they will hold the sleeve 59 in retracted position until the next application. Furthermore, the sleeve 29 prevents the balls 27 from falling out into the central opening 23.

While the sleeve 29 can be relied upon during operation for holding in the balls, they are additionally held by the action of a slight chamfer at the inner ends of the openings 25, as shown at 30. This is to facilitate assembly and to prevent loss of the balls should the sleeve 29 be pushed back by hand when the coupler is not on the fitting. These chamfers must, however, not be enough to interfere with the inward positioning of the balls, as indicated in Fig. 5.

The member 15 may be considered to be an extension from the body 17, being permanently threaded thereon.

The simplicity of the construction is apparent from the drawing and it may be carried out in reliable forms at low cost.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A coupler comprising means for receiving the end of a fitting and having radial openings, radially movable locking members in said openings, an independent sliding sleeve inside the openings and capable of locking said members out, an independent sliding sleeve exterior to the openings and capable of locking said members in, independent means for biasing said sleeves toward locking positions, the locking members permitting only one sleeve at a time to be located in locking position.

2. A coupler comprising means for receiving the end of a fitting having a flange with a groove below, said receiving means having radial openings, radially movable locking members in said opening, an independently sliding sleeve inside the openings and capable of locking out said members, an independently sliding sleeve exterior to them and capable of locking in said members, means for independently biasing said sleeves toward locking positions, the locking members permitting only one sleeve at a time to be located in locking position, said inside locking sleeve being engageable with said flange to be pressed from locking position when the fitting is received.

3. A coupler comprising means applicable over a fitting, radial openings in said means, radially locking members in the openings, an interior locking sleeve and an exterior locking sleeve, said radially movable locking members admitting of only one of said sleeves at a time being placed in locking position, and means for independently biasing each sleeve toward locking position.

RUDY F. SCHNELLER.